(No Model.)
T. T. RODES.
HAND CULTIVATOR.
No. 478,468. Patented July 5, 1892.
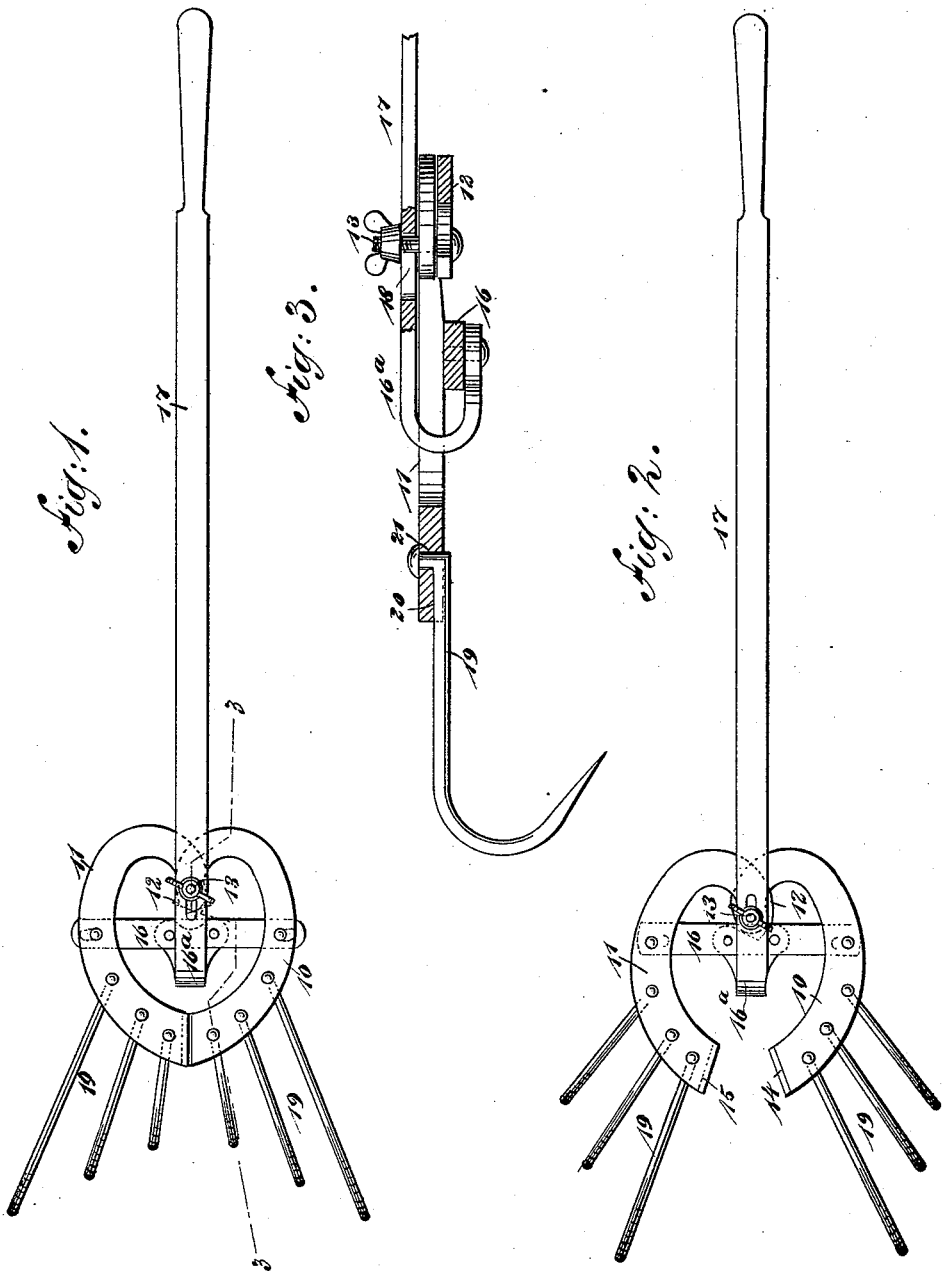
WITNESSES:
INVENTOR:
T. T. Rodes
BY
Munn & Co
ATTORNEYS.

UNITED STATES PATENT OFFICE.

TYREE T. RODES, OF PARIS, MISSOURI.

HAND-CULTIVATOR.

SPECIFICATION forming part of Letters Patent No. 478,468, dated July 5, 1892.

Application filed February 18, 1892. Serial No. 421,962. (No model.)

*To all whom it may concern:*

Be it known that I, TYREE T. RODES, of Paris, in the county of Monroe and State of Missouri, have invented a new and useful Improvement in Hand-Cultivators, of which the following is a full, clear, and exact description.

My invention relates to an improvement in hand-cultivators, and has for its object to provide an implement of exceedingly light, simple, and durable construction, capable of being manipulated in such a manner as to close its jaws or to open them any desired distance in order to cultivate at each side of small plants.

A further object of the invention is to provide a means whereby the teeth of the cultivator will be rigidly secured to the body, and whereby the sections of the body may be opened or closed through the medium of a handle.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in all the views.

Figure 1 is a plan view of the implement, closed or in its contracted position. Fig. 2 is a plan view of the implement in its expanded or open position and illustrating a slight modification in the arrangement of the teeth, and Fig. 3 is a transverse section taken practically on the line 3 3 of Fig. 1.

The body of the implement consists of two jaws 10 and 11, the said jaws being somewhat semicircular in general contour. Their lower ends, however, are curved inward in opposite directions, and in placing the jaws together their inwardly-curved extremities 12 are made to overlap and are pivotally united through the medium of a pin 13, acting as a set-screw or the equivalent thereof. The jaws move upon this pivot 13, and when their outer ends are brought into engagement the shape of the body in some cases, and, as shown in the drawings, approximates somewhat that of a heart; but I do not confine myself to such shape. The outer end of one of the jaws is preferably provided with a tongue 14, adapted to enter a groove 15 in the corresponding portion of the opposite jaw. The movement of the jaws is guided through the medium of a connecting bar or link 16, which has pivotal connection at its ends with the two jaws, the bar being preferably located upon the under side of the body. The connecting-bar 16 has but slight play at its pivotal point, and the said bar at its center is attached directly to the shank $16^a$ of a handle 17. The shank $16^a$ of the handle is curved so that it extends up between the jaws of the body and inward over the overlapping pivoted ends thereof, and the shank is provided above the pivot-point of the jaws with a slot 18, through which the pivot-pin 13 of the jaws passes. A series of teeth 19 is connected with each jaw, extending outwardly therefrom beyond their outer edges. The teeth are quite long and are hook-shaped at their outer ends and are sharpened at said ends to form points. The shape of the points of the teeth preferably approximates that of a diamond in cross-section and the teeth are set at such angles to the body as to incline in direction of the ground and enter the same when the implement is drawn toward the operator. These teeth are ordinarily set about an inch and a half apart at their outer ends, and the inclination of the teeth with respect to the body of the implement is such that the teeth will practically constitute two sides of a triangle, or they may be arranged so as to form a semicircle where they touch the ground, or the teeth may be arranged to form two sides of a triangle with the vertex-point toward the machine, as shown in Fig. 1. In fact, the teeth may be arranged to suit the purpose for which the implement is intended—as, for instance, the inner teeth may be the shortest instead of the longest of the set. The teeth are ordinarily constructed of steel, round in cross-section, and in the inner face of each jaw of the body, at the outer edge thereof, sockets 20 are formed. The inner ends of the shanks of the teeth fit snugly in these sockets and are bent upward from the sockets through apertures 21 produced in the jaws, and the inner ends of the shanks of the teeth are made to extend through these apertures to the upper faces of the jaws, and their outer projecting ends are riveted or otherwise firmly attached to the jaws, as shown in Fig. 3. The pin 13 above referred to is practically a bolt, with a head at the bottom and provided with a wing-nut at its upper extremity of any suitable or approved description. Thus in the use of the implement, when it is desired to cultivate between rows of plants or to stir up the ground irrespective of plants, the jaws are brought together, as shown in Fig. 1, after the thumb-screw has been loosened, and are held in that position by again tightening the screw above referred to, and the tongue 14, which has entered the groove 15, will be held in that position and the teeth of the implement will at that time form a continuous series. In tightening down the wing-nut of the pivot it is made to bear against the slotted portion of the handle-shank. It will thus be observed that the body of the implement has virtually two supports, one at its pivot and the other at the link. If, however, it is desired to cultivate the ground at each side of rows of plants the jaws may be separated as far as may be desired by first loosening the thumb-screw and pushing the same forward. This will cause the jaws to open outward in opposite directions, and when the requisite distance has been attained between the jaws of the device the thumb-screw controlling this motion of the jaws is tightened. By this means a space is formed between the jaws for the admission of the plants, as shown in Fig. 2, and the teeth enter the ground at each side of the row without injury to the plants.

The implement is much lighter than similar implements and in spreading or opening the jaws they open with mathematical precision, which is a decided improvement upon implements of this type—that is to say, when opening or closing the jaws the handle of the implement is always directed to a point midway between the front teeth. The implement is exceedingly compact and the teeth are so fastened that they are perfectly tight and there can be no side or lateral motion to them, neither can they be moved upward or downward.

The implement may be made in as many sizes as may be required.

Having thus described my invention, I claim as new and desire to secure by Letters Patent—

A hand-cultivator, comprising the handle 17, having a longitudinal slot 18, and provided with a transverse cross-bar 16 in front of said slot, the curved tooth-carrying jaws 10 11, pivoted between their ends to the ends of the cross-bar 16 and extending at their rear overlapped ends to the slot 18, and a set-screw passing through the said overlapped ends and the slot 18, substantially as set forth.

TYREE T. RODES.

Witnesses:
GEO. A. WILSON,
J. H. WHITECOTTON.